United States Patent [19]

Kitano et al.

[11] 3,716,293

[45] Feb. 13, 1973

[54] FILM TRANSPORT DEVICE FOR A PROJECTOR

[75] Inventors: Naohiko Kitano, Akira Kamanaka, Mamoru Katsuragi, Tatsuo Kobayashi, Tadashi Iida, all of Osaka-fu, Japan

[73] Assignee: Minolta Camera Kabushiki Kaisha, Osaka-shi, Japan

[22] Filed: Oct. 19, 1970

[21] Appl. No.: 82,018

[52] U.S. Cl..................................353/103, 353/27
[51] Int. Cl......................G03b 23/00, G03b 23/08
[58] Field of Search....353/25, 26, 27, 103, 110, 122; 40/79, 106.1

[56] References Cited

FOREIGN PATENTS OR APPLICATIONS 1,231,770 10/1960 France....................................353/27
883,421 11/1961 Great Britain..........................353/27

Primary Examiner—Leonard Forman
Assistant Examiner—A. J. Mirabito
Attorney—Watson, Cole, Grindle & Watson

[57] ABSTRACT

The present invention relates to a film transport device for a projector and more particularly relates to such a device so constructed that a plurality of original picture frames are arranged in two rows in the same plane on an original picture holding frame. By means of a driving device driven in one direction, said original picture holding frame is moved rectangularly so as to be delivered from one end of one of said two rows to the other end and at the extreme end thereof being moved in a perpendicular direction thereto. The frame is then delivered from one end of the other row to the other end in the opposite direction and at the extreme end thereof, being returned again to the perpendicular direction thereto. Thus, the original picture holding frame is rectangularly moved and thereby original picture frames are projected in turn.

8 Claims, 13 Drawing Figures

INVENTORS,
NAOHIKO KITANO
AKIRA KAMANAKA
MAMORU KATSURAGI
TATSUO KOBAYASHI
TADASHI IIDA

BY Watson, Cole, Grindle & Watson
ATTORNEYS

INVENTORS,
NAOHIKO KITANO
AKIRA KAMANAKA
MAMORU KATSURAGI
TATSUO KOBAYASHI
TADASHI IIDA

BY *Watson, Cole, Grindle & Watson*
ATTORNEYS

FILM TRANSPORT DEVICE FOR A PROJECTOR

BACKGROUND OF THE INVENTION

The present invention relates to a film transport device for a projector, which is so constructed that a plurality of original picture frames are arranged in two rows on substantially the same plane of the original picture holding frame, so as to be projected in turn by moving said original picture holding frame.

In a projector, a plurality of original picture frames must be projected successively in turn, and yet the projection sequence of the original picture frames must be correctly maintained and projected.

Projectors have therefore been so constructed that a slide and a number of said original picture holding frames are stacked in the projector and a delivery device is provided to deliver them so as to project in turn. In a projector constructed in such manner a number of original picture frames are arranged on the circumference of one disk-shaped original picture holding frame or a number of such frames are arranged in a line on a belt-shaped original picture holding frame so as to turn or move said original picture holding frames one by one to project.

In the former type, it is advantageous to continuously project a number of original picture frames although it is disadvantageous to permit the original picture holding frame to build up and, in addition, it is difficult to correctly maintain the original picture frame in the projection sequence or to charge them in the projector. Besides, the formation of the delivery device is complicated.

On the contrary, in the latter type it is advantageous to correctly maintain the original picture frames in the projection sequence, and the formation thereof is simple but the number of frames continuously projectable is decreased and accordingly the sheet number of original picture holding frames is increased thereby becoming bulky in the same manner as the former.

SUMMARY OF THE INVENTION

The primary object of the present invention is to provide an original picture frame delivery device for a projector, which is so constructed that in order to provide a number of original picture frames on each film sheet the original picture frames are arranged in two rows on substantially the same plane and said original picture holding frame is delivered from one end of one of said two rows to the other end and at the extreme end thereof moved to the perpendicular direction thereto. It is then delivered from one end of the other row to the other end in the opposite direction and at the extreme end thereof returned to the perpendicular direction thereto, so as to move rectangularly on the same level surface to project the original picture frame in turn.

Another object of the present invention is to provide an original picture frame delivery device for a projector, which projects a picture of one of the original picture frames in turn by allowing original picture holding frame to deliver rectangularly as described hereinbefore by means of a driving member driven in substantially one direction.

A further object of the present invention is to provide an original picture frame delivery device for a projector, which is provided with a driving member driven in one direction and a lined and toothed portion provided in two rows corresponding to original picture frames arranged in two rows. The driving member and the toothed portion are so arranged that the teeth in one row of said two rows are engaged with said driving member to deliver original picture frames in the appropriate row to the projection station of the projector. After projection of the final original picture frame thereof is effected, according to driving of the driving member, said driving member moves said original picture holding frames perpendicularly so as to engage with the toothed portion in the other row and then said driving member delivers the original picture frames in the other row in turn to the opposite direction.

Other objects of the present invention will become apparent from the following detailed description thereof.

DESCRIPTION OF THE PREFERRED EMBODIMENT

Figure 12:
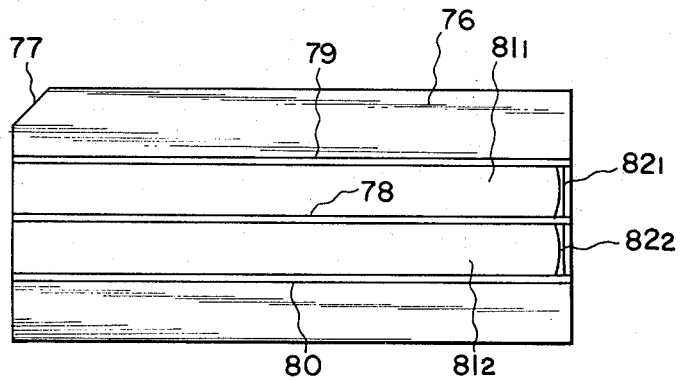
FIG. 12 is a front view of the original picture frame fitting frame in accordance with the present invention.
Figure 13:
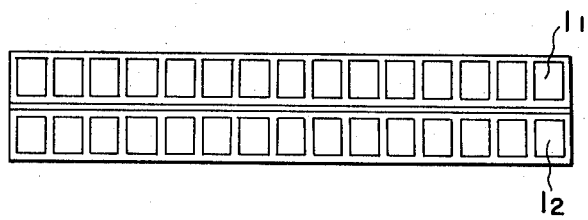
FIG. 13 shows an original picture frame film to be fitted onto said original picture frame fitting frame.

With reference to the drawings an embodiment in accordance with the present invention will be described hereinafter. FIG. 13 shows film strips $1_1$, $1_2$ on which original picture frames in a row are successively photographed. And, referring to FIG. 12, in the central part of film jacket 76, bonding portions 78, 79, 80 are formed in three lines by bonding in the central portion of the board so as to form film pockets $81_1$, $81_2$, and on the right ends of said both pockets film insertion openings $82_1$, $82_2$ are formed so as to insert said films $1_1$, $1_2$. On the left shoulder of the board there is provided a corner cut 77 for regulating the direction and regulating both sides of the film, and on the blank on film pocket $81_1$ the film number, title, description of the index, etc. are recorded. And thus, said film jacket 76 is inserted into original picture holding frame 3 shown in FIG. 1. Said film jacket 76 need not necessarily be formed as described above, it being noted that the original picture frames are required only to be arranged linearly in two lines on the same level surface, and said film jacket is suitable especially to small sized original picture frames such as micro-films.

Figure 1:
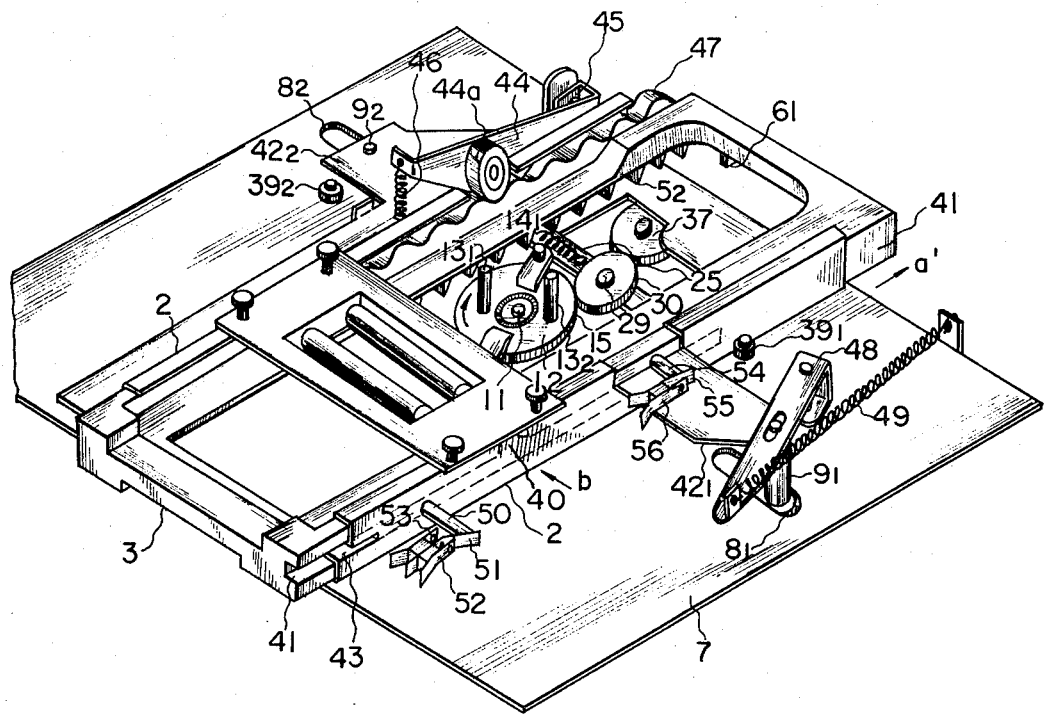
FIG. 1 is a perspective view of an embodiment in accordance with the present invention.
Figure 2:
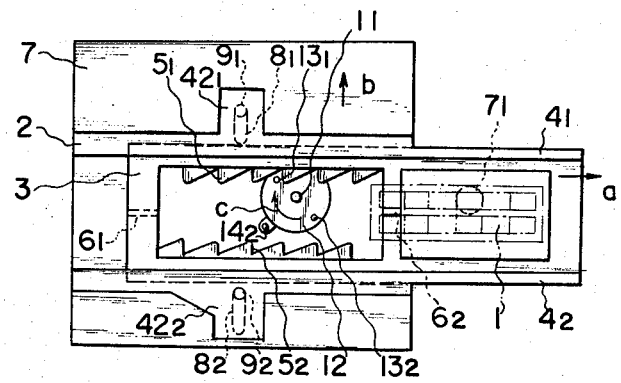
FIG. 2 is a front view showing the relative formations of the driving member, the original picture holding frame, the pedestal, and original picture frames in the embodiment shown in FIG. 1.

Said original picture holding frame 3 is shown clearly without fittings in FIG. 2, wherein in slots 41 formed on the upper and lower edges of said holding frame 3 bent pieces 43 of pedestal 2 are fitted as shown in FIG. 1, so as to be slidable relative to said pedestal 2. Said pedestal 2 is provided with tongues $42_1$, $42_2$ respectively on the upper and lower central portions thereof, and guide pins are formed respectively on said tongues $42_1$, $42_2$ so as to fit in guide slots $8_1$, $8_2$ provided on base plate 7 of projector body 10. Pedestal 2 is movable perpendicularly to the slidable direction of original picture holding frame 3 relative to base plate 7. A lever 48 on which spring 49 is provided is mounted on pin 9, using said pin $9_1$ as a working point relative to base plate 7. When the pin crosses over a dead point the tension of spring 49 moves pedestal 2 up and down by way of pin $9_1$ relative to base plate 7. And, stop pins $39_1$, $39_2$ provided on base plate 7, restrict the up-and-down motion of pedestal 2 against said tension of spring 49 so that one line of original picture frames in the original picture holding frame is located correctly relative to projection hole 71 shown in FIG. 3 and shown by broken lines in FIG. 2.

A regulated one of engagement teeth $5_1$, $5_2$ formed on the top and bottom of original picture holding frame 3 are disposed in engagement with projections $13_1$, $13_2$ provided on driving member 12 for main body 10, which are projected from base plate 7. Teeth $5_1$, $5_2$ are each provided with a toothed face for moving along an opposite direction with respect to one another, so as to engage with said projections $13_1$, $13_2$. As shown in FIG. 2, when driving member 12 turns in the direction shown by arrow c to engage teeth $5_1$ on the upper side, such as engaged to deliver original picture holding frames 3 to the direction shown by arrow a one by one. Thus every frame $1_1$ in the frame line on the upper side is delivered in turn to the front of projection hole 71. After the tooth on the far left of teeth $5_1$ is delivered to the right, original picture holding frame 3 is moved upwardly as a unit with pedestal 2 by means of a mechanism to be described later. Frame $1_2$ on the far left in the lower line faces toward projection hole 71 and at the same time engage teeth $5_2$ in the lower side face to the location for engaging with projections $13_1$, $13_2$. According to the successive turning of driving member 12 in the direction shown by arrow c, teeth $5_2$ are delivered in turn from the far left and original picture holding frame 3 is sent to the opposite direction in the direction shown by arrow a, namely in the direction shown by arrow a' in FIG. 1.

As clearly shown in FIG. 1, on the upper side of original picture holding frame 3 there is formed a wavelike face 47 in the equivalent pitch to every frame width thereof. A roller 44a engages face 47 and is supported rotatably on a lever 44 which is connected by a pin 45 to pedestal 2 and is given a counter-clockwise turning tendency through spring 46. A click mechanism is formed so that when the center of a respective frame faces toward projection hole 71, original picture holding frame 3 is stopped.

Figure 3:
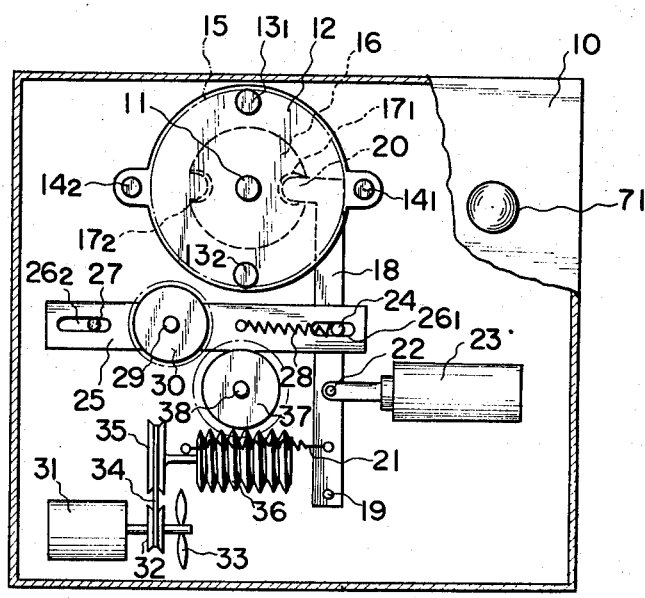
FIG. 3 is a front view showing the formation of the driving member in said embodiment.

The driving mechanism of driving member 12 is shown clearly in FIG. 3. A restraining cam 16 and a driven gear 15 are fixed coaxially with member 12 on shaft 11 and two dent portions $17_1$, $17_2$ are formed on cam 16. A restraining lever 18, pivoted on a pin 19a located on main body 10 and is urged for movement into a counter-clockwise direction by means of a spring 21. Lever 18 is provided with a restraining projection 20 for engaging with said dent portions $17_1$, $17_2$. An electromagnet 23 is provided for moving a plunger into and out thereof, the plunger being pivotally connected to lever 18 at pin 22. Also, a clutch lever 25 is provided as having a guide slot $26_1$ in which a pin 24 on lever 18 is fitted. Lever 25 also has a guide slot $26_2$ in which a pin 27 on body 10 is fitted. A spring 28 resiliently interconnects lever 25 and pin 24.

A pulley 32 and a cooling fan 33 are fixed to the shaft of driving motor 31. Also, a pulley 35 is fixed to the shaft of a worm gear 36 and a belt 34 extends about both pulleys 32 and 35. A driving gear 37 connected to main body 10 by means of a pin 38 is in meshing engagement with worm gear 36.

Upon exciting electromagnet 23 by means of a push button not shown in the drawings, restraining lever 18 is turned clockwise against spring 21 upon the retraction of plunger 23a and restraining projection 20 thereof moves away from dent portion $17_1$ of restraining cam 16. At the same time clutch lever 25 is pulled by spring 28 to move to the right and idle gear 30 meshes with driving gear 37 and driven gear 15, so that driving member 12 begins to turn. Driving member 12 is provided with working projections $14_1$, $14_2$ disposed to lie along a line perpendicular with respect to engage projections $13_1$, $13_2$.

Figure 4:
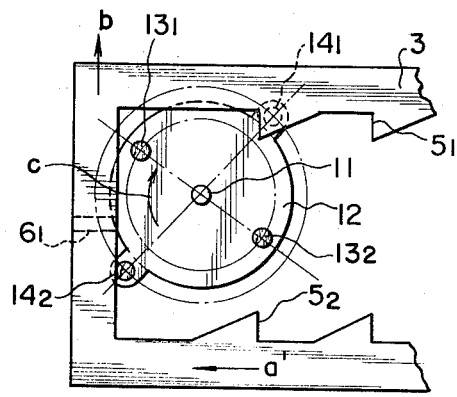
FIG. 4 is a front view partially enlarged showing the change over of lines on the terminals of the lines in said embodiment.

Said working projections $14_1$, $14_2$ are shorter in their axial length as compared with engage projections $13_1$, $13_2$ so that they do not engage teeth $5_1$, $5_2$. However, they are located respectively a greater distance from shaft 11 as compared with engage projections $13_1$, $13_2$ so that when the original picture holding frame 3 is on the right end or the left end position on pedestal 2, it engages with engage pieces $6_1$, $6_2$ formed on both side edges thereof. A line change over member is formed so as to move original picture holding frame 3 and pedestal 2 to the perpendicular direction to lines $1_1$, $1_2$ of the original picture frames. That is, in FIG. 4 original picture holding frame 3 is pushed up to the direction shown by arrow b by means of engage piece $6_1$ engaged with working projection $14_2$, when driving member 12 is turned about 90° to the direction shown by arrow c from the position where engage tooth $5_1$ on the left end of said holding frame 3 is pushed to move to the right by engage projection $13_2$ as shown in FIG. 4. In the successive turning working projection $14_1$ continues to turn without engaging with engage tooth $5_1$ because of the short axis, although the other working projection $14_2$ turns clockwise beneath the left side frame of original picture holding frame 3.

Onto one tongue piece $42_1$ of pedestal 2 there is fixed on opening/closing switch composed of contact piece 55 and contact 56 which has an opening tendency. Projection 54 extending from contact piece 55 slides in contact with the lower edge of original picture holding frame 3, and when said projection 54 faces toward dent portion 40 formed on said lower edge, said switch is opened. Said dent portion 40 is arranged to face toward projection 54 when both lines of original picture frames are projected and returned to their original position. And, a change over switch composed of contact piece 51 and contacts 52, 53 is provided on base plate 7, and said switch has the tendency to ordinarily connect with contact 53 and is so arranged, that when original picture holding frame 3 is pushed up by the line change over member projection 50 of contact piece 51 connects contact piece 51 with contact 52 against said tendency.

Figure 5:
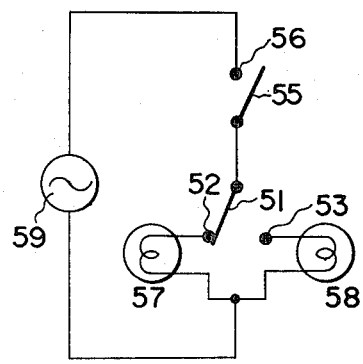
FIG 5 is a circuit diagram showing the line change over in said embodiment.
Figure 6:
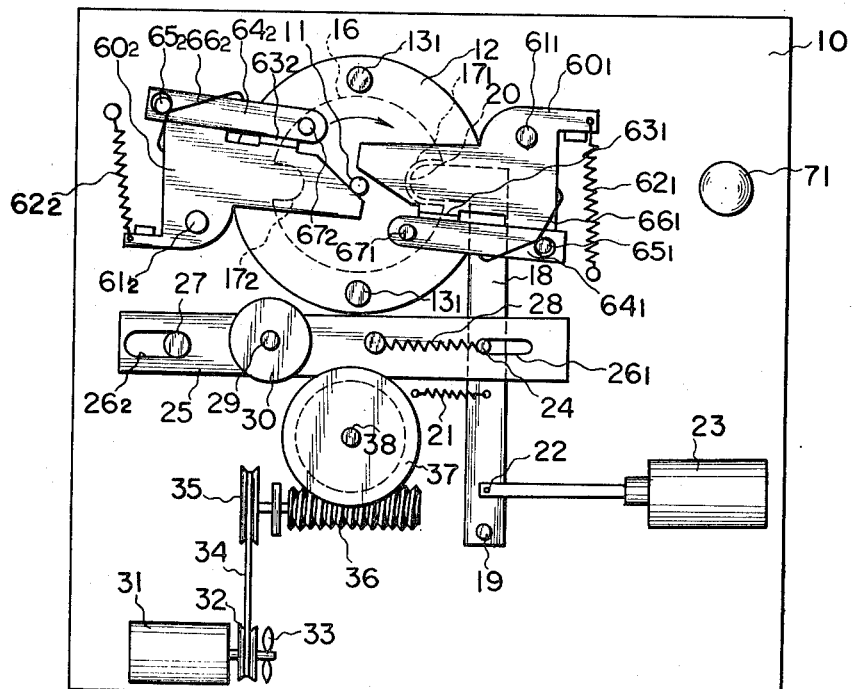
FIG. 6 is a front view of the driving member and the line change over member in the second embodiment in accordance with the present invention.

FIG. 5 is a wiring diagram of the line change over indicating device, wherein two indicator lamps 57, 58 in parallel with each other are connected in series to electric power source 59 and opening/closing switch 55, 56 via said change over switch 51, 52, 53. When the projections of all original picture frames are finished and projection 54 faces toward dent portion 40, both indicator lamps 57, 58 are not energized thereby indicating that the film jacket for original picture frames must be replaced. And, when the original picture frames in lower line $1_2$ are projected, indicator lamp 57 is lit and when the original picture frames in upper line $1_1$ are projected, indicator lamp 58 is lit.

Figure 7:
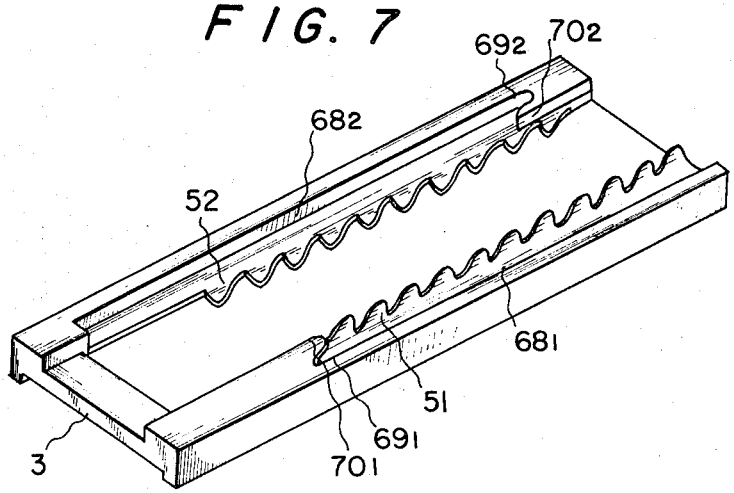
FIG. 7 is a perspective view of the back of the original picture holding frame in said embodiment.
Figure 8:
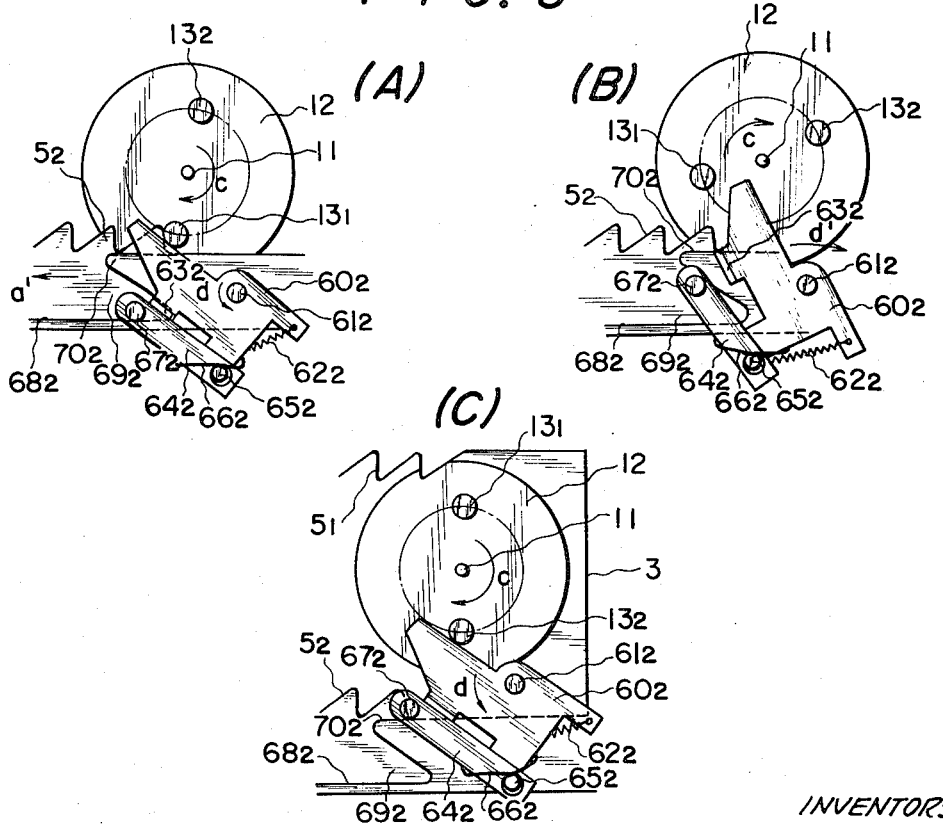
FIGS. 8 are front views partially enlarged of the line change over member in said embodiment, wherein A, B, C are respectively a front view showing in turn the operation situation.
Figure 9:
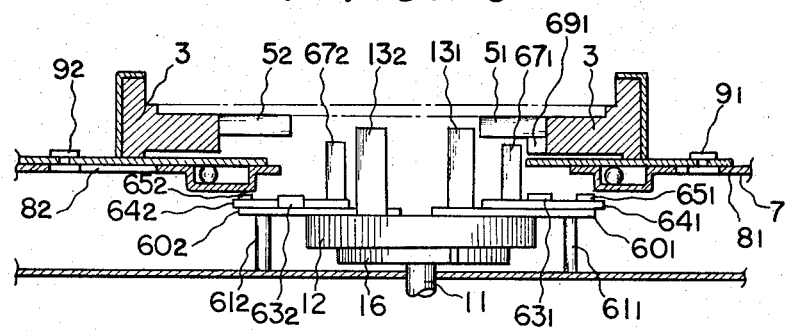
FIG. 9 is a sectional side view of said embodiment.

FIGS. 6 to 9 show another embodiment of the line change over member which formation is substantially the same as that shown in FIG. 1. That is, in said first embodiment the original picture frame delivery is carried out by means of working projections $14_1$, $14_2$ provided on driving member 12, and engage pieces $6_1$, $6_2$ formed on both side edges of original picture holding frame 3. However, in the embodiment shown in FIGS. 6 to 9 said engage pieces $6_1$, $6_2$ are removed, and as much as that portion of the length of original picture holding frame 3 is used effectively. That is, as shown in FIG. 7, on the back side of upper and lower engage teeth $5_1$, $5_2$ two guide pieces for changing over lines are formed in parallel therewith, namely, on the end portions of flat portions $68_1$, $68_2$ extending in the longitudinal direction step portions $70_1$, $70_2$ are formed via notch portions $69_1$, $69_2$, respectively.

On main body 10, line change over levers $60_1$, $60_2$ are provided in face-to-face relation and are pivoted about pins $61_1$, $61_2$ respectively, and are given a turning tendency by means of springs $66_1$, $66_2$ respectively. And, operation lever $64_1$ and $64_2$ are provided on line change over levers $60_1$, $60_2$ for pivotal movement about pins $65_1$ and $65_2$ and are made to turn in the same direction as levers $60_1$ and $60_2$ by means of springs $66_1$ and $66_2$. Rollers $67_1$ and $67_2$ are respectively provided at the free ends of levers $64_1$ and $64_2$ for engaging with step portions $70_1$ and $70_2$. Engaging pieces $63_1$ and $63_2$ are respectively formed on levers $60_1$ and $60_2$ for engaging with levers $64_1$ and $64_2$ when lever $60_1$ or $60_2$ and lever $64_1$ and $64_2$ are rotated reversely with respect to one another.

With reference to FIGS. 8A, B, C the line change over operation will be described hereinafter. First, in FIG. 8A when the final engage tooth $5_2$ is moved by engage projection $13_1$ located on driving member 12 which has been turned in the direction shown by arrow c, said engage projection $13_1$ comes into contact with line change over lever $60_1$. However, line change lever $60_2$ can be turned in the direction shown by arrow d against spring $62_2$ with lever $64_2$ being engaged by piece $63_2$ provided thereon until roller $67_2$ on lever $64_2$ comes into contact with flat portion $68_2$ of step portion $70_2$. Therefore, original picture holding frame 3 does not receive the thrust of engaging portion $13_1$ through lever $60_2$. When the final engage tooth $5_2$ is delivered, roller $67_2$ comes into notch portion $69_2$, and when the press of line change over lever $60_2$ effected by engage projection $13_1$ is stopped, line change over lever $60_2$ is turned in the direction shown by arrow d by spring $62_2$ as shown in FIG. 8B. With this turning operation lever $64_2$ also is pushed by spring $66_2$ and roller $67_2$ is turned clockwise while being in contact with the edge of notch portion $69_2$, to run on step portion $70_2$ as shown in FIG. 8C. In this situation, when engage projection $13_2$ engages with line change over lever $60_2$, said line change over lever $60_2$ cannot turn to the direction shown by arrow $d$ and transmit the downward thrust to step portion $70_2$. Accordingly accordingly original picture holding frame 3 moves downward together with pedestal 2 to change over the lines of the original picture frames.

Figure 10:
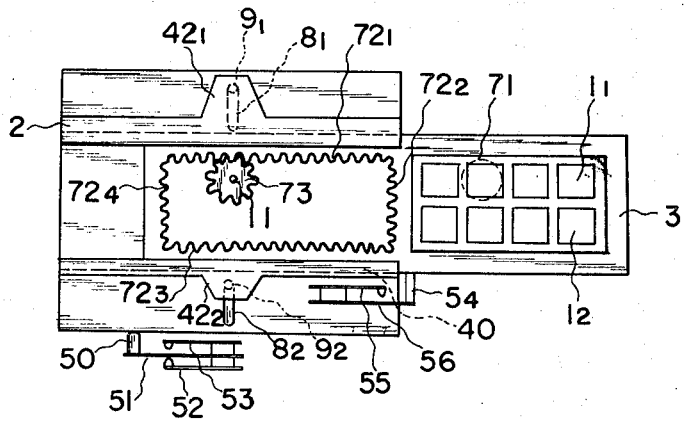
FIG. 10 is a front view of the third embodiment in accordance with the present invention.
Figure 11:
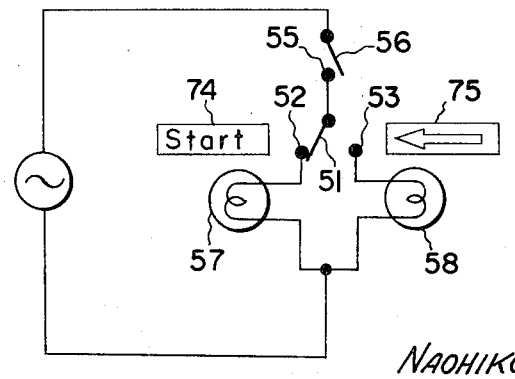
FIG. 11 shows the line change over indicating device and the circuit diagram thereof in said embodiment.

In a third embodiment shown in FIG. 10 in accordance with the present invention, the formation of the line change over member is simplified. Driving member 12 includes a pinion 73 for turning in one direction and the engage teeth formed on original picture holding frame 3 includes upper and lower racks $72_1$, $72_3$. And, on the right and left of said racks $72_1$, $72_3$, rack $72_2$, $72_4$ are formed in succession therewith so as to effect the line change over together with pinion 73. The click mechanism for delivering the original picture lines and the blind motion check mechanism for changing over the lines are identical with those in the first embodiment. Also, the formations of opening/closing switches $54_1$, $55_1$ for the line change over indicating device and change over switches 51, 52, 53, etc. are identical with those in the first embodiment, and the circuit thereof is identical with that shown in FIG. 5 as shown in FIG. 11. However, indicator lamps 57, 58 are arranged to be changed to the automatic delivery by allowing one of them to indicate START and the other to indicate the delivery direction and, thereby, when changing the delivery sequence manually, misoperations effected by the manual operation can be prevented.

We claim:

1. A film transport device for a projector comprising:
   an original picture holding frame having two lined and toothed portions arranged in parallel relation with one another, and provided with a plurality of attached original picture frames arranged in two rows substantially in the same plane in parallel relation with said lined and toothed portions;
   a pedestal having a guide means for supporting said original picture holding frame for sliding movement in a direction along said rows;
   a projector main body having a projecting lens system, a driving motor, a clutch means and a driving member driven by said driving motor through said clutch means, and a guiding member for supporting said pedestal for displacement perpendicularly to said sliding direction; and engaging means on said driving member for engaging with one of said lined and toothed portions to transport one of said original picture frames in the same row to said projecting lens system successively, and for engaging with said pedestal when said engaging means is engaged with the last tooth of one of said lined and toothed portions for exchanging the engagement of said engaging means to the other one of said lined and toothed portions.

2. A film transport device for a projector as set forth in claim 1, where said original picture holding frame is provided in a regular position detachably and exchangeably with a film jacket which is provided with two film insertion openings for inserting respectively a film on which said original picture frames are arranged in a row, and two film pockets arranged in parallel relation with one another.

3. A film transport device for a projector as set forth in claim 1, wherein there is provided with a line change over indicating device comprising an opening/closing switch provided on said pedestal, a change over switch provided on said projector main body, and two indicator lamps arranged in parallel relation with one another connected to an electric power source and said opening/closing switch via said change over switch; said opening/closing being disposed for sliding on an edge piece of said original picture holding frame, which is provided with a dent portion arranged in parallel relation with, said lined and toothed portions wherein, and said dent portion opens said opening/closing switch in the position where said original picture holding frame is equipped and exchanged for the projector, and said change over switch is changed over in accordance with the line change over displacement of said pedestal and said original picture holding frame to connect one of said two indicator lamps to said electric power source and said opening/closing switch, so as to indicate one of two rows of said toothed portions, with which said engaging means of said driving member engages.

4. A film transport device for a projector as set forth in claim 3, wherein said two indicator lamps are operative for indication of the original picture frame line by which the frame delivery is operated and indication of the delivery direction thereof.

5. A film transport device for a projector comprising:
an original picture holding frame having two lined and toothed portions arranged in parallel relation with one another, and provided with a plurality of attached original picture frames arranged in two rows substantially in the same plane in parallel relation with said portions;
a pedestal having a guide means for supporting said original picture holding frame for sliding movement in a direction along said rows;
a projector main body including a guiding member for supporting said pedestal for displacement perpendicularly to said sliding direction;
a gear mounted on a rotary shaft provided on said body;
a restraining cam provided with dent portions at equal intervals on its circumference;
a driving member having engaging means thereon, said driving member including a driven gear;
a restraining lever mounted on said body and being provided with a restraining projection element, spring means urging said element into contact with said cam;
an electromagnet device for turning said lever against said spring means;
a clutch lever provided with an idle gear for following up after said lever has been turned by said electromagnet device;
a driving gear interlocking with a prime mover; and
a line change-over member; whereby the engagement of said restraining projection element and said dent portion is released by operation of said electromagnet, and at the same time, said idle gear connects said driving gear with said driven gear, and said driving member turns in one direction until said restraining projection element engages again with said dent portion, and in the meantime said engaging means engages with one of said toothed portions and delivers one of said original picture frames in a row corresponding to said one toothed portion, and after the final tooth of said one toothed portion in said row is delivered, the turning of said driving member operates said line change-over member to displace said one original picture holding frame and said pedestal relative to said body, and said engaging means engages with the other of said toothed portions to deliver it to the opposite direction one-by-one.

6. A film transport device for a projector comprising:
an original picture holding frame having two lined and toothed portions arranged in parallel relation with one another, and provided with a plurality of original picture frames arranged in two rows substantially in the same plane in parallel with said portions, engaging means provided on the exterior of both ends of said portions at right angles therewith;
a pedestal having a guide means for supporting said original picture holding frame for sliding movement in a direction along said rows;
a projector main body including a guiding member for supporting said pedestal for displacement perpendicularly to said sliding direction;
a driving member mounted on said body in a manner as to be turned in one direction for intermittently coupling with a prime mover provided with a clutch means;
engage projection elements mounted on said driving member; and
line change-over projection elements mounted on said driving member outwardly of said engage projection elements, said line change-over elements having shorter longitudinal axes as compared to the longitudinal axes of said engage elements;
whereby said engage projection elements engage with one of said toothed portions when said driving member is turned to slide one of said holding frames relative to said pedestal while out of engagement with said engaging means, and when the final tooth of said one tooth portion in said row is delivered, the line change-over projection elements engage with said engaging means in accordance with continued turning of said driving member while out of engagement with said toothed portions so as to displace said pedestal and said holding frame perpendicularly to the sliding direction thereof, and said engage projection elements engage with said toothed portion in the other of said rows.

7. A film transport device for a projector comprising:

an original picture holding frame having two lined and toothed portions arranged in parallel relation with one another, and provided with a plurality of original picture frames arranged in two rows substantially in the same plane in parallel relation with said portions;

a pedestal having a guide means for supporting said original picture holding frame for sliding movement in a direction along said rows;

a projector main body including a guiding member for supporting said pedestal for displacement perpendicularly to said sliding direction;

a driving member mounted on said body in a manner as to be turned in one direction for intermittently coupling with a prime mover provided with a clutch means;

engage projection elements mounted on said driving member; and a line change-over lever having operation projection elements mounted on said body symmetrically relative to said driving member, spring means urging said lever into engagement with said engage projection elements and engageable with said guide means;

said guide means having stepped portions corresponding to the final tooth of said toothed portions arranged in parallel relation therewith, so that when said engage projection elements engage with said final tooth in one of said two rows for moving it, said operation projection elements is on said stepped portions, and when said engage projection elements in turning moves said lever, said operation projection elements moves said stepped portions so as to displace said original picture holding frame together with said pedestal, and said engage projection elements thereby engage with said toothed portion in the other of said rows.

8. A film transport device for a projector comprising:

an original picture holding frame provided with a plurality of original picture frames in two rows in the same plane, two rows of frame delivery racks in parallel therewith, and line change-over racks connected to both ends of each of said delivery racks perpendicularly with respect thereto;

a pedestal having a guide means for supporting said original picture holding frame for sliding movement in a direction along said rows;

a projector main body including a guiding member for supporting said pedestal for displacement perpendicularly to said sliding direction; and a driving member mounted on said body and being provided with a pinion for turning said member in one direction into intermittent coupling engagement with a prime mover through a clutch means thereon so as to mesh with one of said delivery racks;

whereby, when said pinion meshes with said one delivery rack the appropriate original picture frame row is delivered, and when said pinion meshes with one of said line change-over racks said original picture holding frame is displaced together with said pedestal, and said pinion meshes with said delivery rack of said other row.

* * * * *